United States Patent [19]
Chiu

[11] Patent Number: 5,924,608
[45] Date of Patent: Jul. 20, 1999

[54] OIL CONTAINER

[76] Inventor: Chun Ta Chiu, 8F-2, No. 185, Fu Kuo Road, Kaohsiung, Taiwan

[21] Appl. No.: 09/015,356

[22] Filed: Jan. 29, 1998

[51] Int. Cl.[6] .............................. B67D 3/00; A47G 19/00; B65D 5/72

[52] U.S. Cl. .......................... 222/538; 222/475; 222/539; 222/568

[58] Field of Search .................................... 222/475, 530, 222/538, 539, 568

[56] References Cited

U.S. PATENT DOCUMENTS

| | | | |
|---|---|---|---|
| 238,300 | 3/1881 | Mattullath | 222/539 |
| 3,052,256 | 9/1962 | Smirles | 222/539 |
| 4,189,072 | 2/1980 | Conn | 222/539 |
| 4,426,027 | 1/1984 | Maynard, Jr. | 222/530 |
| 5,400,928 | 3/1995 | Resnick | 222/538 |

FOREIGN PATENT DOCUMENTS

| | | | |
|---|---|---|---|
| 2238771 | 6/1991 | United Kingdom | 222/530 |

*Primary Examiner*—Andres Kashnikow
*Assistant Examiner*—Keats Quinalty

*Attorney, Agent, or Firm*—Pro-Techtor International Services

[57] ABSTRACT

An oil container having a container body with a spout through which oil is poured, and a discharge tube detachably fastened to the spout for guiding oil out of the spout, the spout having an inner thread and an outer thread, the discharge tube having a tube body and a connector at one end of the tube body for securing the tube body to the spout, the connector having a collar, a first outer thread and a second outer thread separated by the collar, the tube body of the discharge tube being retained inside the container body when the first outer thread of the connector is threaded into the inner thread on the spout, the tube body of the discharge tube being retained outside the container body when the second outer thread of the connector is threaded into the inner thread on the spout, the container body having a tubular handle integral with an outside wall thereof for receiving the discharge tube when the discharge tube is disconnected from the spout, the tubular handle having an inner thread at one end for engagement with the first outer thread at the connector of the discharge tube.

2 Claims, 6 Drawing Sheets

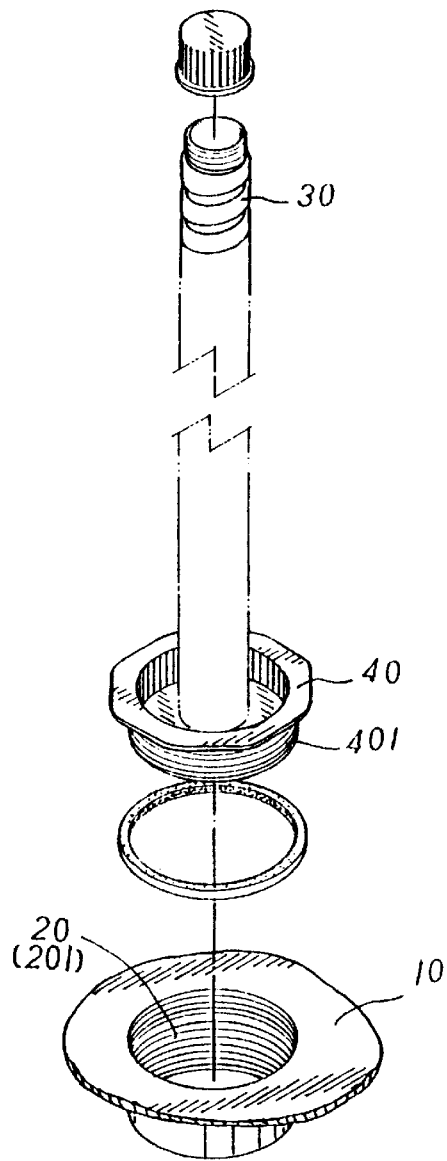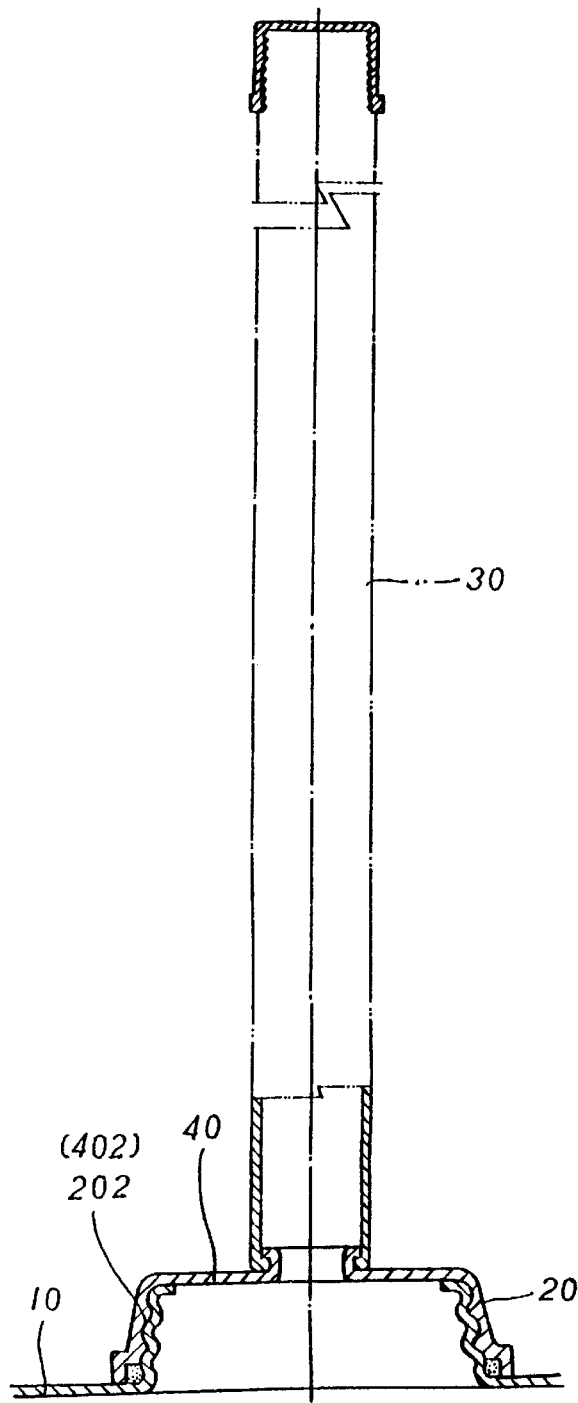
FIG.1 (Prior Art)
FIG.2 (Prior Art)

OIL CONTAINER

BACKGROUND OF THE INVENTION

The present invention relates to an oil container, and more particularly to an improved structure of oil container having a detachable discharge tube.

A regular oil container is generally equipped with a discharge tube through which oil is poured. FIG. 1 shows the arrangement of a discharge tube 30 on an oil tank 10 according to the prior art. The oil tank 10 has a spout 20 with an inner thread 201. The discharge tube 30 has one end integral with a connector 40. The connector 40 has an outer thread 401 for threading into the inner thread 201 on the spout 20. FIG. 2 shows another discharge tube and oil container arrangement according to the prior art. According to this arrangement, the spout 20 of the oil container 10 has an outer thread 202, the connector 40 of the discharge tube 30 has an inner thread 402 threaded into the outer thread 202 on the spout 20. In the aforesaid two structures, the discharge tube 30 must be carefully received when it is removed from the spout 20. If the discharge tube 30 is removed from the oil container 10 and carelessly placed in any place, it tends to be covered with dust or rainwater. If the discharge tube 30 is covered with dust, it will contaminate oil when installed in the spout 20 of the oil container 10.

SUMMARY OF THE INVENTION

The present invention has been accomplished to provide an oil container which eliminates the aforesaid problems. According to the invention, the container body of the oil container has a tubular handle for receiving the discharge tube when the discharge tube is disconnected from the spout of the container body. The tubular handle has an inner thread at one end. The connector at one end of the discharge tube has a first outer thread and a second outer thread separated by a collar thereof. The first outer thread of the connector is threaded into the inner thread on the spout or the tubular handle when the discharge tube is received inside the container body or the tubular handle. The second outer thread of the connector is threaded into the inner thread on the spout to hold the discharge tube to the spout outside the container body when the discharge tube is used for guiding oil out of the spout.

BRIEF DESCRIPTION OF THE DRAWINGS

FIG. 1 is an exploded view showing an oil container and discharge tube arrangement according to the prior art.

FIG. 2 is a sectional view showing another oil container and discharge tube arrangement according to the prior art.

DETAILED DESCRIPTION OF THE PREFERRED EMBODIMENT

Figure 3:
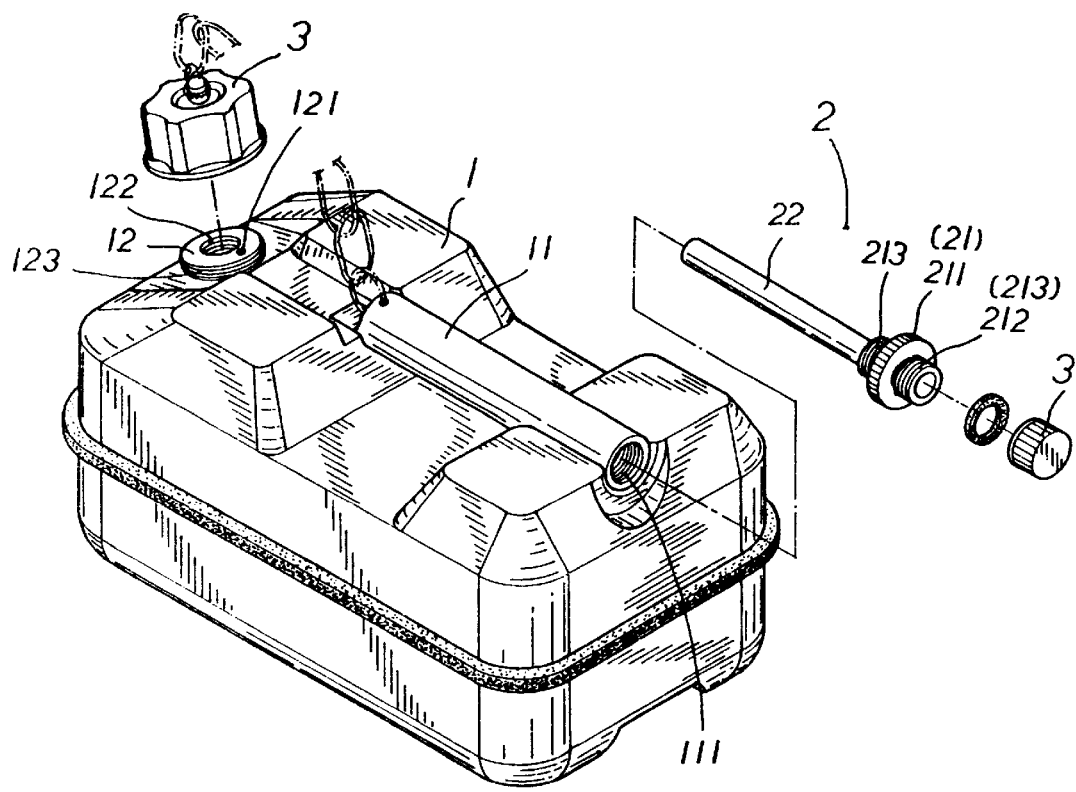
FIG. 3 is an exploded view of an oil container according to the present invention.
Figure 4:
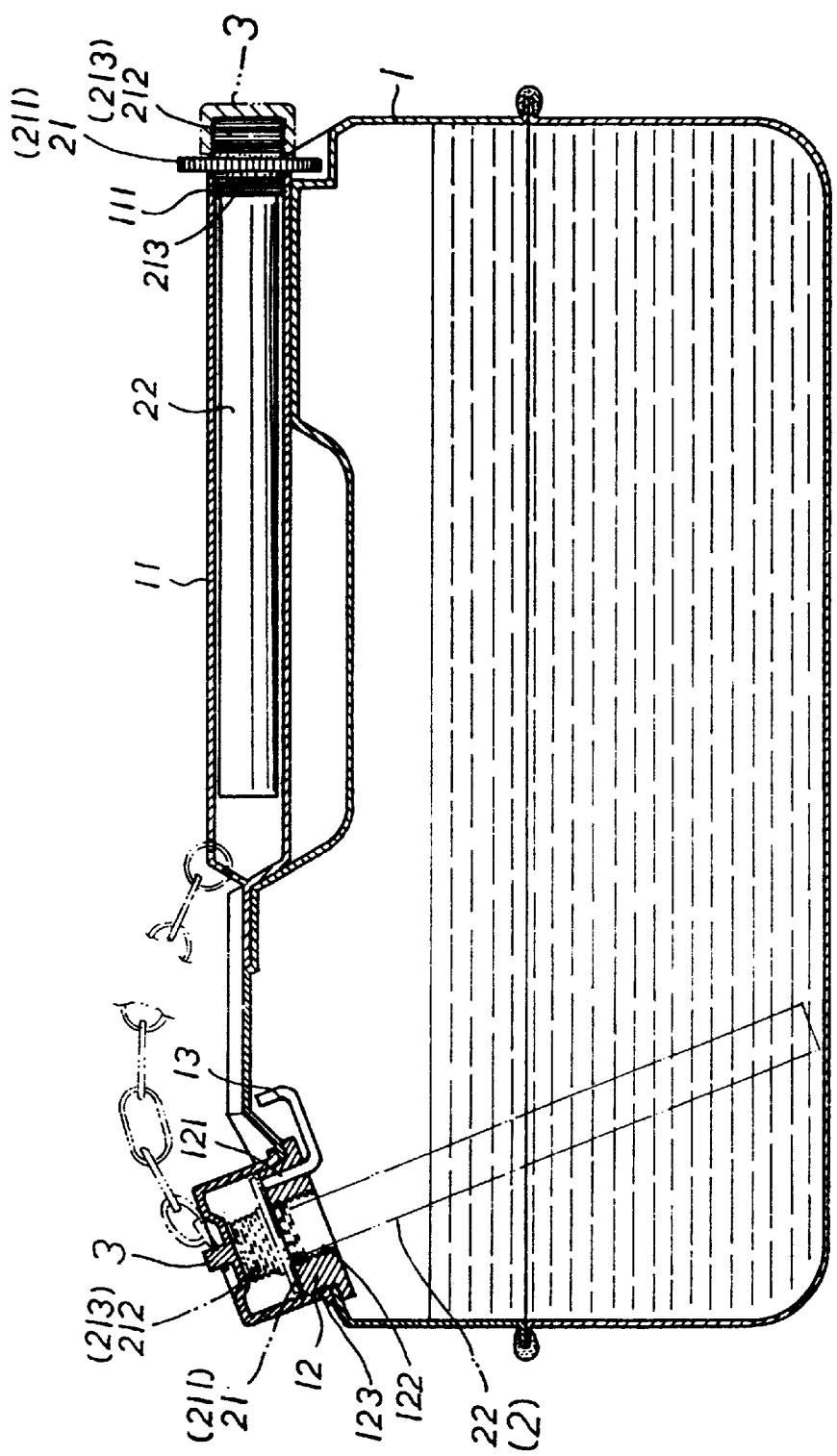
FIG. 4 is a sectional view of the present invention.
Figure 5:
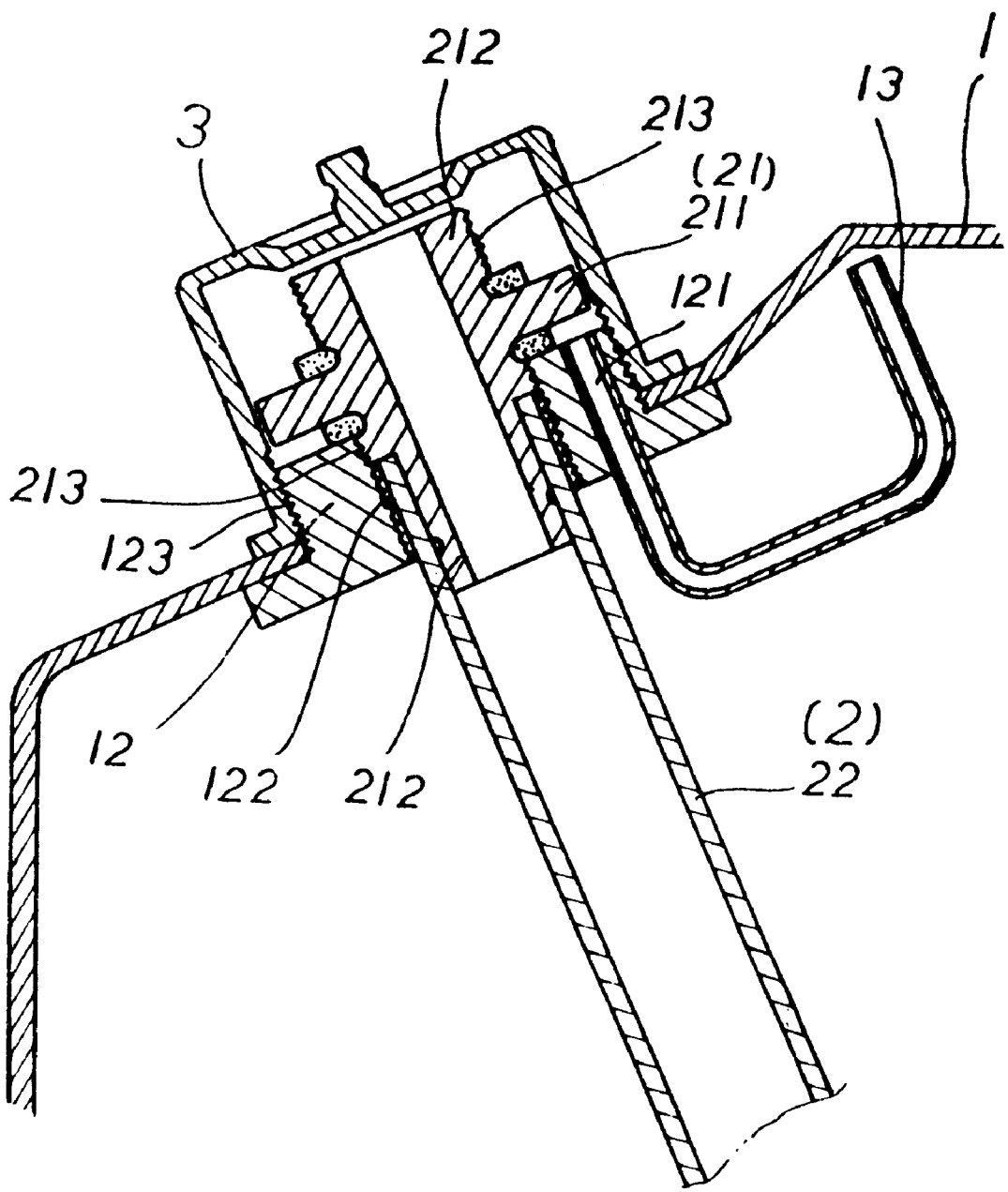
FIG. 5 is a sectional view in an enlarged scale of a part of the present invention, showing the discharge tube fastened to the spout and dipped in the oil contained in the container body.

Referring to FIGS. 3, 4 and 5, an oil container in accordance with the present invention comprises a container body 1. A spout 12 is provided at the top of the container body 1 near one vertical short side thereof. A tubular handle 1 is integral with the container body 1 at the top. The tubular handle 1 has an inner thread 111 at one end remote from the spout 12. The spout 12 has an inner thread 122, and an outer thread 123. The container body 1 has an air vent 121 piercing through the peripheral wall of the spout 12 and disposed in parallel to the oil passage way defined in the spout 12. A guide tube 13 is fastened to the air vent 121 and suspending inside the container body 1 through which the inside pressure of the container body 1 is balanced with the atmospheric pressure. A discharge tube 2 is provided for connection to the spout 12. The discharge tube 2 comprises a plastic tube 22, and a connector 21 integral with one end of the plastic tube 22. The connector 21 comprises a tubular connector body 212 axially connected to the plastic tube 22, a collar 211 on the middle of the tubular connector body 212, and two outer threads 231 at two opposite ends of the tubular connector body 212. When the discharge tube 2 is not used, it can be received in the tubular handle 11 by inserting the plastic tube 22 into the tubular handle 11 and threading one outer thread 231 of the connector 21 into the inner thread 111 on the tubular handle 11 (see FIG. 4), or in the container body 1 by inserting the plastic tube 22 into the spout 12 and threading one outer thread 231 of the connector 21 into the inner thread 122 on the spout 12 (see FIG. 5). When the discharge tube 2 is received in the tubular handle 11 of the container body 1, a screw cap 3 is fastened to the outer thread 123 on the spout 12 or one outer thread 213 on the connector 21 to seal out dust. When in use, one outer thread 213 of the connector 21 is threaded into the inner thread 122 on the spout 12, permitting the plastic tube 22 to be extended from the spout 12 outside the container body 1.

Figure 6:
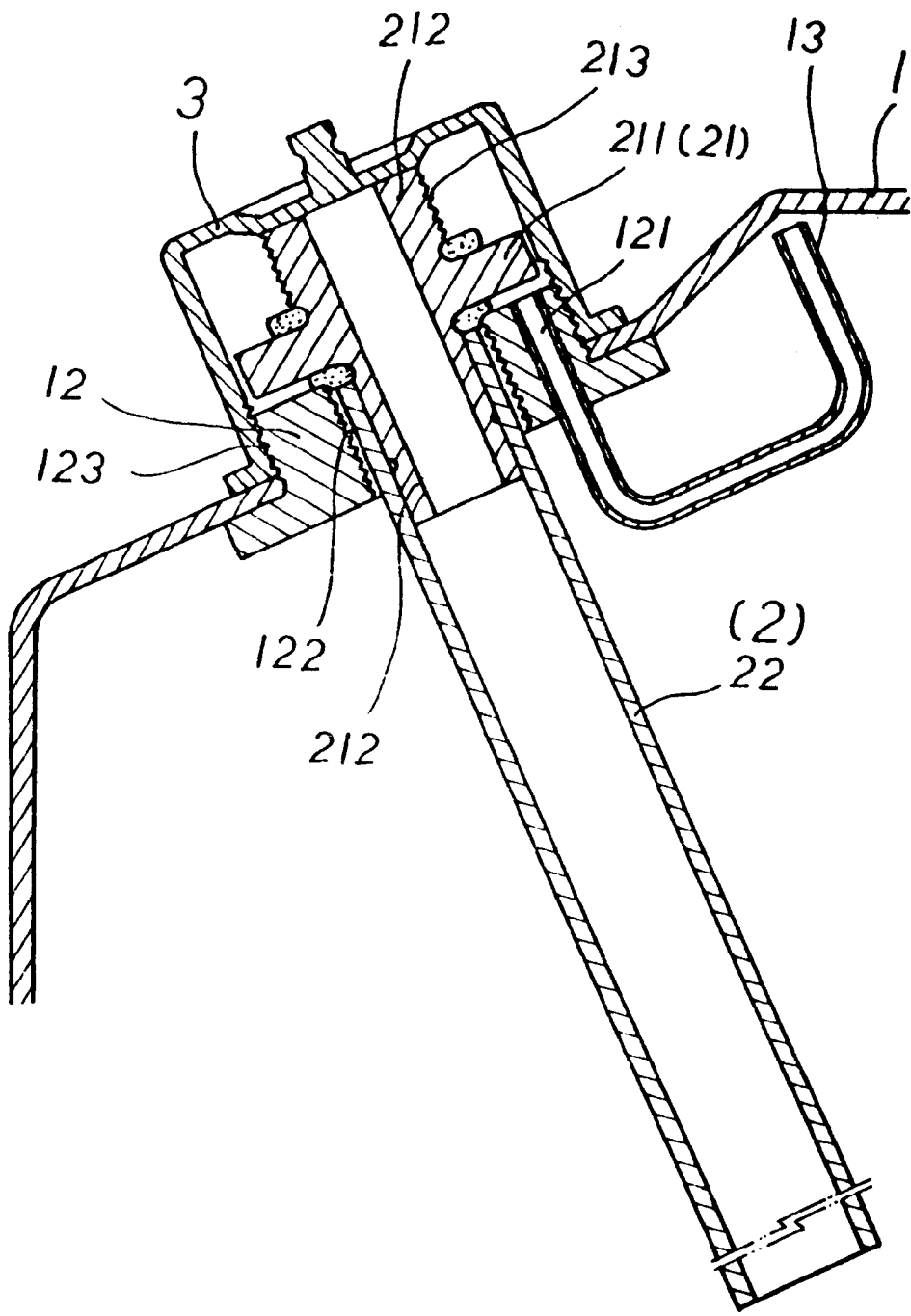
FIG. 6 is a partial view in section of an alternate form of the present invention.

FIG. 6 shows an alternate form of the present invention, in which the connector 21 of the discharge tube 2 has only one outer thread 213 at an outer end. The inner end of the connector 21 has a smooth outside wall fitted into one end of the plastic tube 22.

Figure 7:
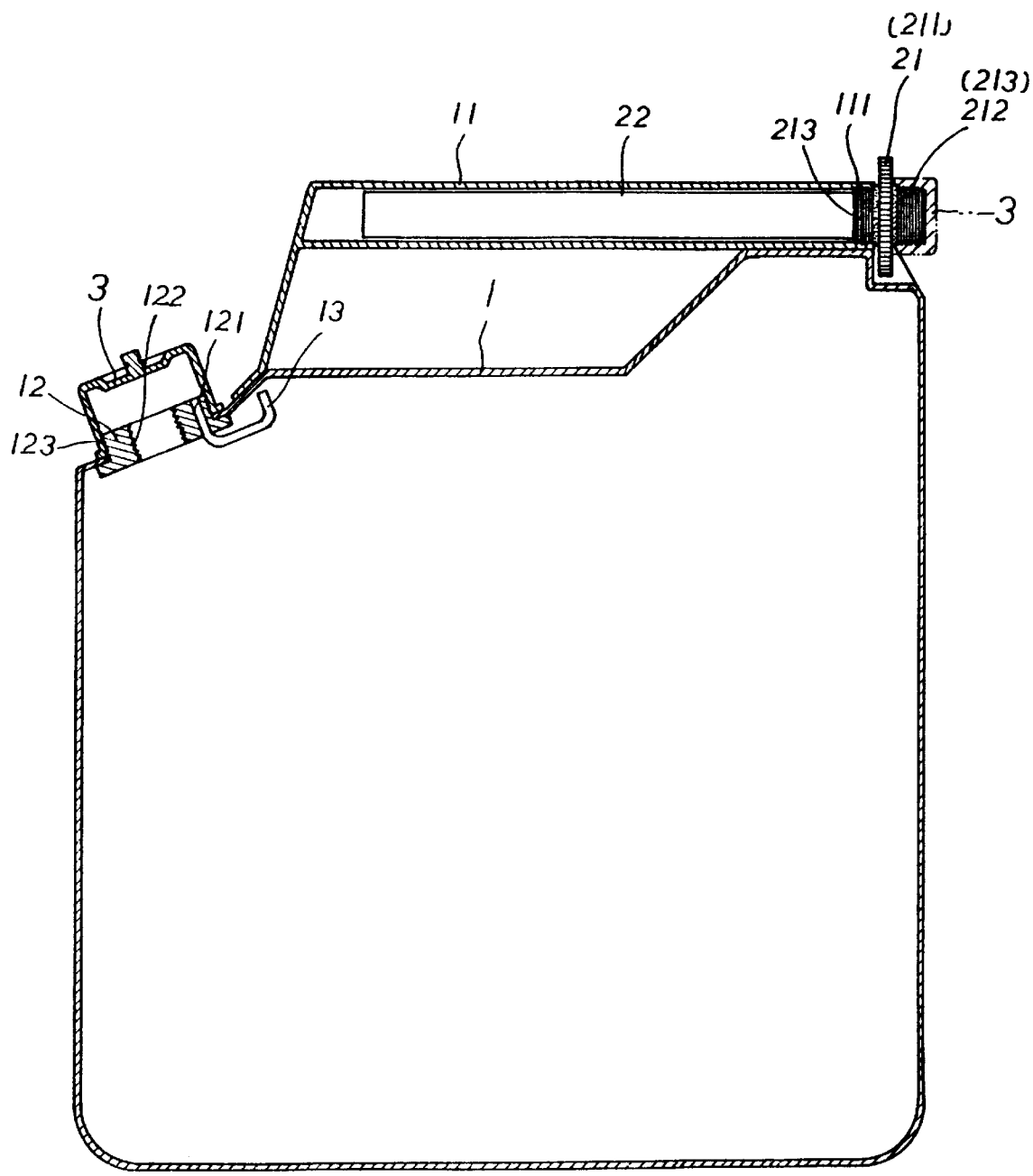
FIG. 7 shows the invention used in a vertical oil container.

The invention can be used in a horizontal oil container as shown in FIG. 4, as well as a vertical oil container as shown in FIG. 7.

It is to be understood that the drawings are designed for purposes of illustration only, and are not intended as a definition of the limits and scope of the invention disclosed.

What the invention claimed is:

1. An oil container comprising:

a container body having a spout through which oil is poured, said spout having an inner thread and a discharge tube detachably fastened to said spout for guiding oil out of said spout, said discharge tube having a tube body and a connector at a first end of said tube body for securing said tube body to said spout, said connector having a collar, an inner end connected to said tube body, an outer end separated from said inner end by said collar, and an outer thread at said inner end of said connector of said discharge tube being retained inside said container body when said outer thread at said inner end of said connector is threaded into said inner thread on said spout, and when said oil container is in use, an outer thread at said outer end of said connector of said discharge tube being threaded into said inner thread on said spout such that said tube body extends outward from said container body, and wherein said container body comprises a tubular handle integral with an outside wall thereof for receiving said discharge tube when said discharge tube is disconnected from said spout, said tubular handle having an inner thread at one end for engagement with said outer thread at said inner end of said connector of said discharge tube, a cap with an inner thread being provided to cover said outer thread at said outer end of said connector.

2. The oil container of claim 1, whereion said spout has an outer thread, and is detachably covered with a screw cap, said screw cap having an inner thread for threading onto the outer thread on said spout.

* * * * *